UNITED STATES PATENT OFFICE.

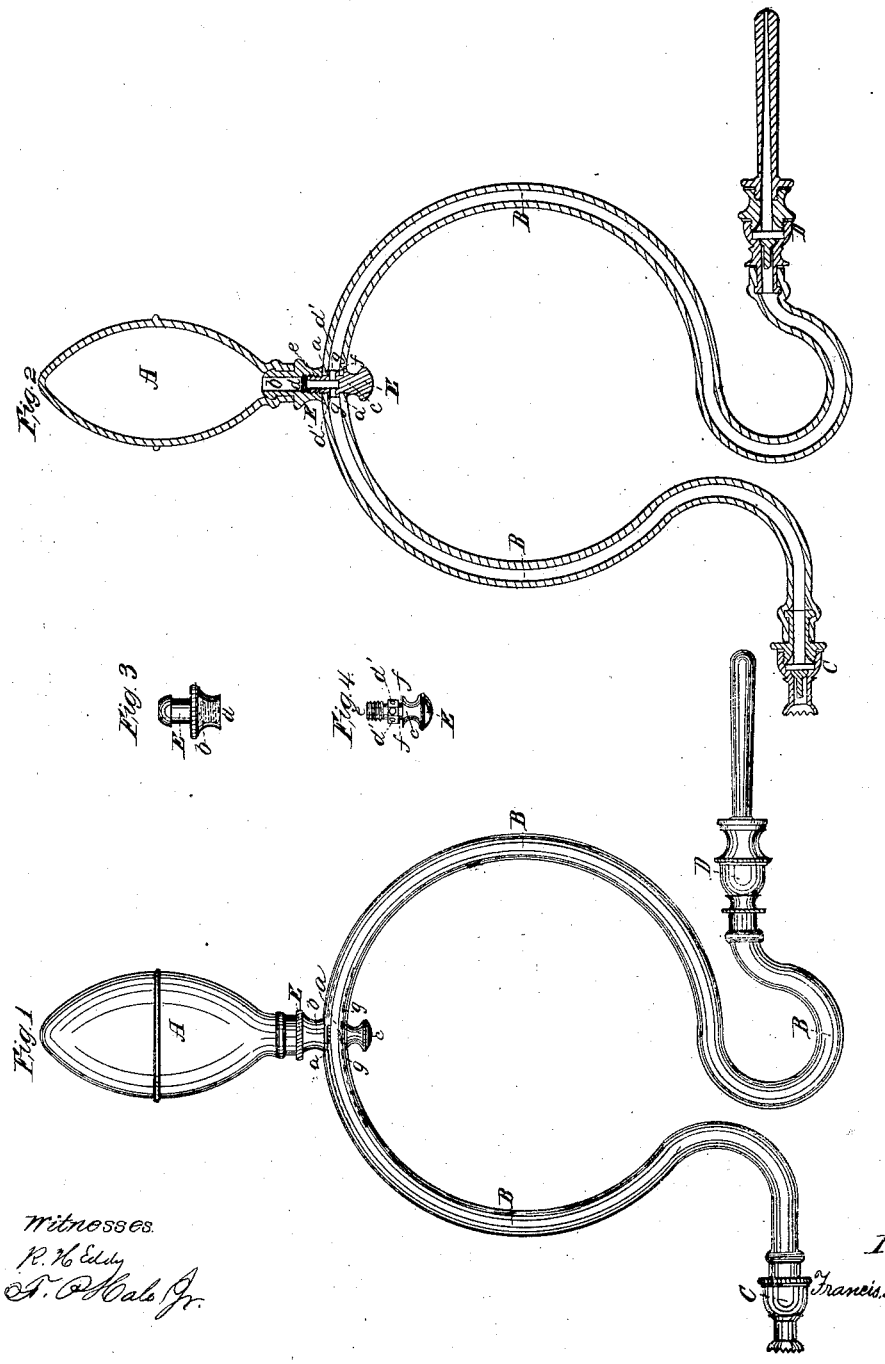

FRANCIS B. RICHARDSON, OF BOSTON, MASSACHUSETTS.

ENEMA-SYRINGE.

Specification forming part of Letters Patent No. 31,626, dated March 5, 1861; Reissued November 13, 1877, No. 7,946.

*To all whom it may concern:*

Be it known that I, FRANCIS B. RICHARDSON, of Boston, in the county of Suffolk and State of Massachusetts, have invented a new and useful Improvement in Enema-Syringes; and I do hereby declare the same to be fully described in the following specification and illustrated in the accompanying drawings, of which—

Figure 1, is a front elevation, and Fig. 2, a longitudinal section of an elastic bulb enema syringe provided with my invention. Figs. 3, and 4, are separate views of the two parts of the metallic connection by which the elastic bulb and conduit are joined together.

In carrying out my invention with one single flexible and elastic conduit, instead of two such separate conduits or pipes of induction and eduction as heretofore employed, I not only construct such conduit with a lateral perforation carried through its two opposite sides, but extend the metallic connection of the bulb through such perforation and so form the parts that the elasticity of the conduit or pipe around the perforation may cause the latter to close or fit so about the extension of the metallic connection as to make therewith a tight joint or joints. I also make the metallic connection with one or more lateral passages to open into the bore of the elastic conduit and that of the said connection.

In the drawings, A, denotes the elastic bulb, B, is a caoutchouc, elastic, and flexible single pipe which at its two extremities is connected with the valve chambers, C, D. This pipe is made with a lateral perforation, $a$, which should lead through opposite sides of it and into its bore. The metallic connection E, on which the bulb is fixed, opens into the bulb passes into such perforation and opens into the bore of the tube, the perforation being made of a diameter less than that of the part received by it. By so making such perforation, the elasticity of the material of which the tube may be composed will cause the tube to close tightly on the part extended through it and thus form therewith a tight joint or joints.

For the better security of tightness of the joint at the upper part of the perforation, and for other purposes, I construct the metallic connection in two parts, $b$, $c$, and with screws $d$, $e$, by which they may be joined together. The male screw portion, $c$, I form with a shoulder $d'$, extending around it, at the base of the screw. On this shoulder the tube about the perforation rests, and besides, it is pressed against the shoulder by the female screw part $d$, when the two parts $b$, $c$, are coupled together. In this way, not only is a tight joint insured at the upper part of the perforation, but the pipe is maintained in place under a downward bend or strain on it. The part, $c$, may also have a groove extending around it to receive the lower part, $g$, of the pipe which should be sprung into such groove. In this way the joint may be made closer than it can be without the groove.

In some respects my mode of applying the elastic bulb and its flexible pipe of induction and eduction is preferable to that which is usually termed a "threefold metallic connection", that is such as is described and represented in a patent granted to me and another on May 8th, 1860, for a three fold metallic connection when constructed and applied as shown in such patent, requires two separate flexible pipes, whereas, with my invention as represented in the drawings, but one flexible pipe is employed. Furthermore by making my metallic connection in two parts, $b$, $c$, constructed and screwed together as described, the upper part, $b$, containing a female screw, answers, when it and the bulb are removed together from the lower part $e$ to receive a small terminal jet tube such as will be suitable for injecting a liquid either into the urethra, the eye or ear of a person, and thus, the bulb with such small tube may be employed as a syringe for delicate operations.

By employing one single flexible and elastic conduit, applied to the bulb as hereinbefore described and as represented in the drawings, I not only obtain close joints but a stronger connection than is the case when two flexible conduits are applied to a three fold inelastic connection as above described.

I do not herein claim such a three fold metallic connection, and two separate flexible pipes used in combination and as a means of joining the elastic bulb with the valve cases of an enema syringe; nor do I claim for such purpose, a single elastic and flexible tube, B, having a lateral perforation made entirely through it transversely to its axis, and with the metallic connection so made and applied to such tube, or through a swell or bulb of the tube as to make with the tube and by means of teats or projections from such connection, tight joints.

I claim—

My new or improved bulb and tube connection as made in two separate tubular parts (b, c) and respectively inserted in or applied to the elastic bulb and the tube or connection of the valve chambers and so as to operate therewith or connect the bulb and valve chambers, substantially in manner and for the purpose as described.

FRANCIS B. RICHARDSON.

Witnesses:
R. H. EDDY,
F. P. HALE, Jr.